United States Patent [19]

Patel

[11] Patent Number: 5,639,715
[45] Date of Patent: Jun. 17, 1997

[54] AQUEOUS BASED DRILLING FLUID ADDITIVE AND COMPOSITION

[75] Inventor: Arvind D. Patel, Houston, Tex.

[73] Assignee: M-I Drilling Fluids LLC

[21] Appl. No.: 217,432

[22] Filed: Mar. 24, 1994

[51] Int. Cl.$^6$ .................................................. C09K 7/00
[52] U.S. Cl. ........................................ 507/135; 507/131
[58] Field of Search ..................................... 507/131, 135

[56] References Cited

U.S. PATENT DOCUMENTS

| | | | |
|---|---|---|---|
| 3,034,983 | 5/1962 | Reddie et al. | 252/8.5 |
| 3,061,542 | 10/1962 | Reddie et al. | 252/8.5 |
| 3,062,740 | 11/1962 | Reddie et al. | 252/8.5 |
| 3,107,739 | 10/1963 | Mathews | 175/72 |
| 3,214,374 | 10/1965 | Sample, Jr. | 252/8.5 |
| 3,396,105 | 8/1968 | Burdyn et al. | 252/8.5 |
| 3,761,410 | 9/1973 | Mondshine et al. | 252/8.5 |
| 4,384,096 | 5/1983 | Sonnabend | 526/313 |
| 4,532,053 | 7/1985 | Morita et al. | 252/8.55 D |

FOREIGN PATENT DOCUMENTS 2160244  12/1985  United Kingdom .

OTHER PUBLICATIONS

Mona Industries, Inc. Surfactants, Technical Bulletin 212H (Apr., 1985).
Mona Industries, Inc., Monawet Sno–35, Technical Bulletin 285E (Apr., 1985).
Derwent Publications Ltd., London, GM; AN 91–274418 and DD–A–289 283 (Veb Erdol—Erdgas), 25 Apr. 1991 (Abstract.

*Primary Examiner*—Sharon Gibson
*Assistant Examiner*—Valerie Fee
*Attorney, Agent, or Firm*—Arnold, White & Durkee

[57] ABSTRACT

A water based drilling fluid which is environmentally non-toxic containing a sodium alkylsufosuccinate and well drilling additives, said sodium alkylsulfosuccinate is water dispersible and imparts anti-bit balling, lubricity and environmentally non-toxicity properties to said drilling fluid and does not precipitate in the presence of the said well drilling additives.

13 Claims, No Drawings

AQUEOUS BASED DRILLING FLUID ADDITIVE AND COMPOSITION

BACKGROUND OF THE INVENTION

This invention relates to drilling fluid additives and specifically surfactants which suppress the bit balling and sticking of the drill cuttings suspended in drilling fluids to the drillstring and drill pipe in a subterranean well during the drilling process. The invention is particularly directed to anti-bit bailing and lubricating materials comprising sodium alkylsulfosuccinates which are also environmentally acceptable.

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low-permeability filter cake that seals openings in formations penetrated by the bit and act to reduce the unwanted influx of formation fluids from permeable rocks. Finally, the drilling fluid is used to collect and interpret information available from drill cuttings, cores, and electrical logs.

Drilling fluids are typically classified according to their base material or primary continuous phase. In oil-base fluids, solid particles are suspended in oil, and water or brine may be emulsified in the oil. The oil is typically the continuous phase. In water-base fluids, solid particles are suspended in water or brine, and oil may be emulsified in the water. Water is the continuous phase. Environmental concerns have limited the use of oil-base drilling fluids. Accordingly, oil drilling companies have increasingly focused on water-base fluids.

The additive of this invention is primarily classified as a surfactant. Surfactants are used in all types of drilling fluids, and for several purposes. They serve as emulsifiers, foamers, defoamers, wetting agents, detergents, lubricants, and corrosion inhibitors. Surfactants are important constituents of both oil based muds and water based muds.

Current drilling fluid components must be environmentally acceptable. As drilling operations impact on plant and animal life, drilling fluid additives should have low toxicity levels and should be easy to handle and to use to minimize the dangers of environmental pollution and harm to personnel. Moreover, in the oil and gas industry today, it is desirable that additives work both onshore and offshore and in fresh and salt water environments.

It has been suggested that certain materials be added to a drilling mud to enhance the lubricating properties thereof. There are several objectives sought to be obtained by such addition. First, a conventional rolling cutter bit depends upon the drilling mud to lubricate the bearings of the cutters. It is not at all uncommon that a cutter bearing will fail before the cutter teeth have been worn out; and by prolonging the life of the bearings through increased lubrication, a longer bit life should be obtained. Such longer life would reduce the number of round trips required to change bits, reduce fishing jobs for lost cutters, and also reduce the danger of losing a hole during a round trip. Further, a drilling fluid having enhanced lubricating properties would reduce drill string torque, thereby reducing the likelihood of twist-offs. It would also permit the use of higher bit loadings and rotating speeds to increase the drilling rate. Moreover, it would be desirable for the lubricating properties of the drilling fluid to be such that the drill string would be oil wetted to minimize differential pressure sticking.

While other advantages might be mentioned, the above are sufficient to indicate the value of increasing the lubricating properties of drilling fluids.

In attempting to achieve the above advantages by the use of a lubricating or extreme-pressure additive to a drilling fluid, it has been found that the various known additives have been rather specific in their reaction in the drilling fluid. Thus, while a particular additive will work well in one environment, it may fail in another. For example, the additives heretofore suggested are sensitive to caustic so that they are either ineffective or of greatly reduced efficiency in fluids of elevated pH. Also, many are sensitive to oils so that their efficiency decreases as the oil content of the well fluid increases. Some of the additives have had undesired interaction with solids suspended in the drilling fluid. For example, they may cause the solids to be oil wetted. Some of the additives have poor compatibility with fluids containing substantial amounts of dissolved alkaline earth compounds such as lime base muds, wherein they tend to form curds. Foaming and poor dispersability have been the basis for objections to still other additives. Still other additives cause the drilling fluid to fluoresce under ultraviolet light which is objectionable, since such fluorescence interferes with "black light" well logging operations, particularly in wild cat wells.

It is apparent to anyone selecting or using a drilling fluid for oil and gas exploration that an essential component of a selected fluid is that it be properly balanced to achieve the necessary characteristics for the specific end application. As stated hereinabove, the typical compositions include oil based muds, water based muds and pneumatic fluids. For purposes of this application, only oil and water based mud systems will be relevant. The vast majority of oil and gas exploration is done with water based muds. The primary reason for this preference is price and environmental compatibility. Traditional oil based muds made from diesel or mineral oils, while being substantially more expensive than water based drilling fluids, are environmentally incompatible. As a result, the use of oil based muds has been historically limited to those situations where they are necessary.

The effectiveness of a drilling fluid and in particular the additives found in the drilling fluid are evaluated by measurement of certain characteristics of the drilling system. The viscosity, gel strength, filtrate loss, contamination control and tolerance to divalent ion characteristics of drilling fluids and drilling systems are all directly attributable to the components of the drilling fluid or drilling mud. These properties, their definitions and a general explanation is found in a comprehensive treatise entitled *Composition and Properties of Drilling and Completion Fluids*, 5th Ed., George R. Gray and H. D. H. Darley, Gulf Publishing Company, (1988).

Oil and water base muds have contrasting attributes and disadvantages. Although drilling fluids utilizing an oil based mud inhibit well bore swelling by minimizing dispersion fluid, the environmental toxicity of oil muds often overshadow the positive features. Oil base systems can be created with low toxicity but all systems are pollutants to varying degrees. In addition, the cost parameters of an oil mud are often prohibitive when compared to a water based system. Furthermore, the rheological and thixotropic character of an oil mud is not as versatile for maximized hole cleaning as certain aqueous fluids.

Cost effectiveness and environmental acceptability are major advantages of an aqueous drilling fluid but one major disadvantage also exists. Swelling and/or dispersion of formation clays causes general instability of the wellbore with resultant hole enlargement.

Inhibitive materials such as lime, gypsum, tannates and tannate/chrome lignosulfonate systems are used to minimize the factors causing an unstable wellbore.

Due to their chemical nature, these materials require frequent maintenance treatments and/or sufficient sodium hydroxide for solubilization. The resultant hydroxide radical ion causes the dispersion of the clay material. The degree of dispersion is proportional to the hydroxide radical concentration. The dispersion is a major cause of the high solids content of tannate and chrome lignosulfonate systems. A high quantity of low gravity solids content has detrimental effects on another parameter also. There is direct correlation between high quantities of low gravity solids content and reduced rates of penetration.

SUMMARY OF THE INVENTION

This invention relates to a new and novel surfactant for use in drilling fluids. The surfactant is a sodium alkylsulfosuccinate of the chemical formula:

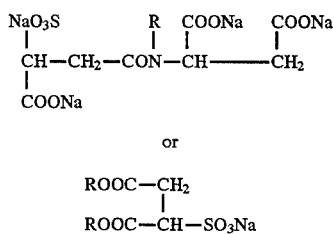

wherein R is an alkyl group selected from the group of $C_4$ to $C_{18}$.

The surfactant of this invention is environmentally non-toxic in addition to the low-foaming properties that the surfactant of this invention impart to a drilling fluid other advantages include: better calcium ion tolerance, alkaline stability, salt tolerance, lower detergency, good wetting properties, and better lubricity, anti-bit balling and anti-sticking properties. All of these listed advantages are significant in the use of surfactants and other chemicals in the use of drilling fluids in subterranean wells.

The surfactant of this invention has its primary utility in aqueous based drilling fluids. As such, water solubility or dispersability are important characteristics of the surfactant of this invention. That the surfactant of this invention be characterized by at least a 25% solubility in water is important. The surfactant of this invention is typically used in drilling fluids at concentrations of up to 15 pounds per barrel. Lesser concentrations may be viable depending on drilling conditions.

The water soluble or water dispersable sodium alkylsulfosuccinates that have shown utility in the practice of this invention are: tetrasodium N-(1,2-dicarboxyethyl) N-alkyl ($C_{18}$) sulfosuccinamate, sodium diisobutylsulfosuccinate, sodium dihexylsulfosuccinate, and combinations thereof. Each of these materials is described by one or both of the chemical formulas recited hereinabove.

The surfactant of this invention has not heretofore been known or utilized as an additive in aqueous based drilling fluids, nor has the surfactant of this invention been combined with other drilling fluid ingredients to form drilling fluid compositions. The beneficial results and environmental non-toxic characterization of drilling fluids using the surfactant of this invention are unexpected results.

DETAILED DESCRIPTION OF THE PREFERRED EMBODIMENT

The surfactants that have demonstrated utility in this invention are generically described as sodium alkylsulfosuccinates. The specific sodium alkylsulfosuccinates that have shown utility in the practice of this invention are: tetrasodium N-(1,2-dicarboxyethyl) N-alkyl ($C_{18}$) sulfosuccinamate, sodium diisobutylsulfosuccinate, sodium dihexylsulfosuccinate, and combinations thereof. These preferred materials are sold by Mona Industries, Inc. under the trade names Monawet SNO-35, Monawet MB-45, and Monawet MM-80.

The surfactants of this invention function by lowering the surface tension of the water phase of drilling fluids to promote the wetting characteristic and impart anti-bit balling and anti-sticking properties to the drill solids and increase the lubricity of the drilling fluid. Additional functions performed by the surfactants of this invention are as an emulsifier, a wetting agent, a solubilizer, and a dispersant to ensure the participation of other drilling fluid ingredients which contribute to the desired characteristics of the final drilling fluid. Overall the surfactant of this invention performs like a drilling fluid conditioner ("mud conditioner").

The surfactants of this invention are in solution and typically a colorless clear liquid. In certain instances at higher molecular weights the sodium alkylsulfosuccinates may be a light yellow viscous liquid. The surfactants of this invention typically have a pH of from about 4.5 to about 8.5 with a preferred pH being 6. The molecular weight of the surfactants of this invention range from approximately 300 to approximately 750. Preferred molecular weights are between 330 and 655. The surfactants of this invention are anionic in nature and have a specific gravity of from about 1.05 to 1.14. The sodium alkylsulfosuccinates of this invention are at least 25% soluble or dispersible in water and are environmentally non-toxic.

In the preferred embodiment of this invention the sodium alkylsulfosuccinate of this invention is added to the base drilling fluid at a concentration of up to 15 pounds per barrel. Lesser amounts can also be used depending on the overall chemistry of the drilling fluid and the geophysical characteristics of the formation being drilled.

Environmental non-toxicity is an important characteristic of the surfactant and resulting drilling fluid of this invention. The environmental toxicity of drilling fluids containing surfactants was conducted using a 96 hour range finder bioassay using the standard EPA protocol. The tests were conducted on a suspended particulate phase (SPP) of the sample using Mysidopsis Bahia. The SPP is the unfiltered supernatant extracted from a 1:9 mixture of the drilling fluid and seawater which was allowed to settle for 1 hour. A 96 hour $LC_{50}$ of greater than 1 million ppm was determined for the drilling fluid. The highest concentration (1 million) of SPP tested had an observed 55% survival.

The $LC_{50}$ is the medium lethal concentration or the quantity of a toxic substance in the surrounding water that produces 50% mortality in the test species. The greater the 96 hour $LC_{50}$ value, the lower the toxicity of the drilling fluid sample being tested. The negative control (20 mysid shrimp in straight seawater) showed 100% survivability, the results of the bioassay verify that drilling fluids with the surfactants of this invention, e.g., sodium alkylsulfosuccinates, are greater (less toxic) than the 30,000 ppm toxicity limitation set by the Gulf of Mexico NPDES permit. For purposes of this application the term environmentally non-toxic shall be understood to refer to a 96 hour $LC_{50}$ of greater than 30,000. Similar testing run with conventional surfactants such as coco diethanolamide have resulted in a conclusion that those materials were highly toxic.

A variety of additives can be included in the aqueous based drilling fluid of this invention. Specifically, materials generically referred to as gelling materials or organic polymers ("gelling agent"), thinners and fluid loss control agents are typically added to aqueous based drilling fluid formulations. Of these additional materials each can be added to the formulation in a concentration as theologically and functionally required by drilling conditions. Typical of gelling agents used in aqueous based drilling fluids are high molecular weight polymers such as PHPA, biopolymers, bentonite, attapulgite, and sepiolite. Examples of biopolymers are guar gum, starch and the like.

Similarly, it has been found beneficial to add certain materials as thinners for aqueous based drilling fluids. Typically lignosulfonates, lignitic materials, modified lignosulfonates, polyphosphates and tannins are added. In other embodiments low molecular weight polyacrylates can also be added as thinners. Thinners are added to a drilling fluid to reduce flow resistance and gel development. Other functions performed by thinners include to reduce filtration and cake thickness, to counteract the effects of salts, to minimize the effects of water on the formations drilling, to emulsify oil in water, and to stabilize mud properties at elevated temperatures.

The water based drilling fluid of this invention additionally includes a weighting material, sometimes referred to as a weighting agent. The type and quantity of weighting material depends upon the desired density of the final drilling fluid composition. The preferred weight materials include, but are not limited to: barite, iron oxide, calcium carbonate, magnesium carbonate, and combinations of such materials and derivatives of such materials. The weight material is typically added in a quantity to result in a drilling fluid density of up to 24 pounds per gallon, preferably up to 21 pounds per gallon and most preferably up to 19.5 pounds per gallon.

Finally, fluid loss control agents such as modified lignite, polymers and modified starches and cellulose and sized material such as $CaCO_3$ or salt can be added to the aqueous based drilling fluid system.

The drilling fluid additives of this invention have special utility in the drilling fluids art because they are both non-toxic and compatible with other drilling fluid components within commercially acceptable parameters. For purposes of this application, a compound should be understood to exhibit "low toxicity" when it possesses an $LC_{50}$ value of greater than 30,000 in the Mysid shrimp test prescribed by the U.S. Environmental Protection Agency for offshore drilling discharges. Likewise, a compound is considered compatible with other drilling fluid components when it fails to yield a precipitant in the presence of such drilling fluid additives.

From the foregoing, it will be seen that this invention is one well adapted to attain all of the ends and objects hereinabove set forth, together with other advantages which are obvious and which are inherent to the composition and process. It will be understood that certain features and subcombinations are of utility and may be employed without reference to other features and subcombinations. This is contemplated by and is within the scope of the claims. As many possible embodiments may be made of the invention without the departing of the scope thereof, it is to be understood that all matter herein set forth is to be interpreted as illustrative and not in a limiting sense.

EXAMPLES

The following examples are submitted for the purpose of illustrating the toxicity and performance characteristics of the sodium alkylsulfosuccinates of this invention. The tests were conducted in accordance with the procedures in API Bulletin RP 13B-2, 1990. The following abbreviations are sometimes used in describing the results discussed in the examples:

"PV" is plastic viscosity which is one variable used in the calculation of viscosity characteristics of a drilling fluid.

"YP" is yield point which is another variable used in the calculation of viscosity characteristics of drilling fluids.

"GELS" is a measure of the suspending characteristics and the thixotropic properties of a drilling fluid.

"F/L" is API fluid loss and is a measure of fluid loss in milliliters of drilling fluid at 100 psi.

A base drilling fluid (also referred to as Generic Mud #7) was prepared from the following ingredients:

| | |
|---|---|
| Seawater (20 ppt) | 140 ml. |
| Sea Salt | 3 gm. |
| Deionized Water | 140 ml. |
| M-I Gel (bentonite gel) | 35 gm. |
| Tannathin | 3 gm. |
| Caustic Soda | 2 gm. |
| CMC Reg. (carboxymethylcellulose) | 1 gm. |
| Spersene (lignosulfonate) | 3 gm. |
| Rev. Dust | 50 gm. |
| Soda Ash | 1 gm. |
| Lime | 1 gm. |
| M-I Bar (barite) | 160 gm. |

EXAMPLE 1

Using the base drilling fluid (Generic Mud #7) the environmental characteristics of the use of coco diethanolamide ("CDA") were tested.

The 48-hour acute, aquatic toxicity of a laboratory-prepared drilling fluid (CDA @ 2 lbs/bbl in Generic Mud #7) is evaluated. The results are presented below.

A 48-hour bioassay using the standard EPA protocol was conducted on the suspended particulate phase (SPP) of the sample using *Mysidopsis bahia*. The SPP is the unfiltered supernatant extracted from a 1:9 mixture of the drilling fluid and seawater which was allowed to settle for one hour. A 48-hour $LC_{50}$ of <30,000 ppm was obtained for the laboratory-prepared drilling fluid. The $LC_{50}$ is the median lethal concentration or the quantity of a toxic substance in the surrounding water that produces 50% mortality in the test species. The greater the 48-hour $LC_{50}$ value, the lower the toxicity of the drilling fluid sample being tested. The negative control (20 mysids in straight seawater) showed 100% survivability.

The results of this bioassay indicate that the 48-hour $LC_{50}$ for this laboratory-prepared drilling mud sample (<30,000 SPP) is less (i.e., more toxic) than the 30,000 ppm toxicity limitation set by the Gulf of Mexico NPDES permit.

EXAMPLE 2

Using the base drilling fluid (Generic Mud #7) the environmental characteristics of the use of CDA in combination with the other drilling fluid additives (ES-828) were evaluated.

The acute aquatic toxicity of a laboratory-prepared drilling fluid (ES-828 @ 5 lbs./bbl. in Generic Mud #7) was evaluated. The results are presented below.

A 96-hour bioassay using the standard EPA protocol was conducted on the suspended particulate phase (SPP) of the sample using *Mysidopsis bahia*. The SPP is the unfiltered supernatant extracted from a 1:9 mixture of the drilling fluid and seawater which was allowed to settle for one hour. A 96-hour $LC_{50}$ was not obtainable for the laboratory-prepared drilling fluid sample with the test concentrations used. The $LC_{50}$ is the median lethal concentration or the quantity of a toxic substance in the surrounding water that produces 50% mortality in the test species. Survivability was only 31.7% in the 2.5% suspended particulate phase (the lowest concentration used). The greater the 96-hour $LC_{50}$ value, the lower the toxicity of the drilling fluid sample being tested. The negative control (60 mysids in straight seawater) showed 91.7% survivability.

The results of this bioassay indicate that the 96-hour $LC_{50}$ for this laboratory-prepared drilling mud sample (<25,000 ppm SPP) is less (i.e., more toxic) than the 30,000 ppm toxicity limitation set by the Gulf of Mexico NPDES permit.

EXAMPLE 3

Using the base drilling fluid (Generic Mud #7) the environmental characteristics of the use of sodium alkylsulfosuccinates were tested. Specifically, Monawet SNO-35, tetrasodium N-(1,2-dicarboxybutyl ethyl)-N-alkyl ($C_{18}$) sulfosuccinamate, sold by Mona Industries, Inc., of Paterson, N.J. was tested.

The 96-hour acute, aquatic, toxicity of a laboratory-prepared drilling fluid sample containing 5.0 lb/bbl SNO-35 in Generic Mud #7 was evaluated. The results are presented below.

A 96-hour range-finder bioassay using the standard EPA protocol was conducted on a suspended particulate phase (SPP) of the sample using *Mysidopsis bahia*. The SPP is the unfiltered supernatant extracted from a 1:9 mixture of the drilling fluid and seawater which was allowed to settle for one hour. A 96-hour $LC_{50}$ of greater than 1,000,000 ppm was determined for the drilling fluid. The highest concentration (1,000,000) of SPP tested had an observed 65% survival. The $LC_{50}$ is the median lethal concentration or the quantity of a toxic substance in the surrounding water that produces 50% mortality in the test species. The greater the 96-hour $LC_{50}$ value, the lower the toxicity of the drilling fluid sample being tested. The negative control (20 mysids in straight seawater) showed 100% survivability.

The results of this bioassay indicate that the 96-hour $LC_{50}$ for this laboratory-prepared drilling mud sample (greater than 1,000,000 ppm SPP) is greater (i.e. less toxic) than the 30,000 ppm toxicity limitation set by the Gulf of Mexico NPDES permit.

EXAMPLE 4

Drilling fluid compositions were prepared with coco diethanolamide (Composition 1), Monawet SNO-35 (Composition 2), and Monawet MB-45 (Composition 3) utilizing Generic Mud #7 as the control and base mud. The formulation of each drilling fluid is reported in Table 1.

TABLE 1

| Component | Control | Composition 1 | Composition 2 | Composition 3 |
| --- | --- | --- | --- | --- |
| Sea water | 140 ml | 140 ml | 140 ml | 140 ml |
| Sea salt | 3 gm | 3 gm | 3 gm | 3 gm |
| Deionized water | 140 ml | 140 ml | 140 ml | 140 ml |
| Bentonite | 35 gm | 35 gm | 35 gm | 35 gm |
| Lignite | 3 gm | 3 gm | 3 gm | 3 gm |
| Caustic Soda | 2 gm | 2 gm | 2 gm | 2 gm |
| CMC | 1 gm | 1 gm | 1 gm | 1 gm |
| Lignosulfonite | 3 gm | 3 gm | 3 gm | 3 gm |
| Drill Solids | 50 gm | 50 gm | 50 gm | 50 gm |
| Soda ash | 1 gm | 1 gm | 1 gm | 1 gm |
| Lime | 1 gm | 1 gm | 1 gm | 1 gm |
| Barite | 160 gm | 160 gm | 160 gm | 160 gm |
| CDA | — | 2.0 gm | — | — |
| SNO-35 | — | — | 2.0 gm | — |
| MB-45 | — | — | — | 2.0 gm |

The initial rheological properties were measured for each composition at room temperature and are recorded in Table 2.

TABLE 2

| Reading (RPM) | Control | Composition 1 | Composition 2 | Composition 3 |
| --- | --- | --- | --- | --- |
| 600 | 77 | 108 | 77 | 73 |
| 300 | 45 | 89 | 45 | 44 |
| PV | 32 | 19 | 32 | 29 |
| YP | 13 | 70 | 13 | 15 |
| GELS 10"/10' | 16/50 | 40/70 | 14/47 | 11/47 |

Following the recording of initial rheological properties, each of the compositions was heat aged at 150° F. for 16 hours. The resulting rheological properties of the compositions are recorded in Table 3.

TABLE 3

| Reading (RPM) | Control | Composition 1 | Composition 2 | Composition 3 |
| --- | --- | --- | --- | --- |
| 600 | 50 | 300+ | 71 | 49 |
| 300 | 28 | 230 | 40 | 29 |
| PV | 22 | — | 31 | 29 |
| YP | 6 | — | 9 | 9 |
| GELS 10 sea/ 10 min | 3/15 | 45/70 | 9/20 | 5/20 |

The results reported above confirm that drilling fluids can be prepared using the surfactants of this invention without flocculating the base mud.

EXAMPLE 5

The following experimental procedure and results confirm that the surfactants of this invention impart desirable lubricity properties to drilling fluids.

A 1% solution of surfactant as in deionized water was tested on a Baroid lubricity meter (Model No. 21200-EP/ Lubricity Tester). The lubricity coefficient of the samples were calculated and recorded in Table 4. Deionized water was used as base.

TABLE 4

| Sample | Coefficient | % Reduction |
|---|---|---|
| Base (DI water) | .34 | — |
| Monawet SNO-35 | .095 | 72 |
| Monawet MB-45 | 0.13 | 61.76 |

The noted reduction in the lubricity coefficient confirms the improved lubricity properties imparted by use of the surfactants of this invention.

EXAMPLE 6

The following experiment shower the lubricity properties of surfactants of this invention in 22.5 ppb bentonite slurry in water. The coefficient of friction on sandstone was determined using a Lubricity Evaluation Monitor (LEM) designed by M-I Drilling Fluids Company. Table 5 shows the reduction in coefficient friction with Monawet SNO-35 and Monawet MB-45 using 22.5 ppb gel slurry as base.

TABLE 5

| Sample | Coefficient of Friction | % Reduction |
|---|---|---|
| 22.5 ppb Bentonite slurry | 0.636 | — |
| Slurry + 1% MB-45 | 0.585 | 8.1 |
| Slurry + 4% MB-45 | 0.251 | 60.5 |
| Slurry + ½% SNO-35 | 0.168 | 73.9 |

EXAMPLE 7

The surface tension measurement were carried out on Monawet SNO-35 and coco diethanolamide (CDA) at various concentrations and various temperatures. The following results establish that the higher surface tension values of the products of this invention when compared to the prior art, coco diethanolamide (CDA), would have lower foaming in drilling fluid applications.

Below is a summary of the results:

| 0.0% SNO-35 in DI WATER Temperature (°C.) | Surface Tension (dynes per centimeter) |
|---|---|
| 24 | 64 |
| 33 | 61 |
| 42 | 60 |
| 50 | 59 |

| 0.1% SNO-35 in DI WATER Temperature (°C.) | Surface Tension (dynes per centimeter) |
|---|---|
| 24 | 51 |
| 38 | 47 |
| 43 | 45 |
| 50 | 44 |

| 1.0% SNO-35 in DI WATER Temperature (°C.) | Surface Tension (dynes per centimeter) |
|---|---|
| 24 | 49 |
| 36 | 42 |
| 45 | 38 |
| 50 | 37 |

| 2.0% SNO-35 in DI WATER Temperature (°C.) | Surface Tension (dynes per centimeter) |
|---|---|
| 24 | 46 |
| 38 | 41 |
| 44 | 39 |
| 49 | 37 |

Below is a summary of results:

| 0.01% CDA in DI WATER Temperature (°C.) | Surface Tension (dynes per centimeter) |
|---|---|
| 23 | 28 |

| 0.1% CDA in DI WATER Temperature (°C.) | Surface Tension (dynes per centimeter |
|---|---|
| 23 | 29 |

| 1.0% CDA in DI WATER Temperature (°C.) | Surface Tension (dynes per centimeter |
|---|---|
| 23 | 30 |

| 2.0% CDA in DI WATER Temperature (°C.) | Surface Tension (dynes per centimeter) |
|---|---|
| 23 | 30 |

What is claimed is:

1. A water based drilling fluid containing a sodium alkylsulfosuccinate compound and well drilling additives which do not precipitate the sodium alkylsulfosuccinate compound wherein said sodium alkylsulfosuccinate is environmentally non-toxic, water dispersible and imparts anti-bit balling and lubricity properties to said drilling fluid.

2. The water based drilling fluid of claim 1 wherein said sodium alkylsulfosuccinate is selected from the group consisting of: tetrasodium N-(1,2-dicarboxyethyl) N-alkyl ($C_{18}$) sulfosuccinamate, sodium diisobutylsulfosuccinate, sodium dihexylsulfosuccinate, and combinations thereof.

3. The water based drilling fluid of claim 1 wherein said sodium alkylsulfosuccinate is present in said drilling fluid at a concentration of up to about 15 pounds per barrel.

4. The water based drilling fluid of claim 1 further comprising a weight material selected from the group consisting of: barite, iron oxide, calcium carbonate, magnesium carbonate, and combinations thereof.

5. The water based drilling fluid of claim 4 further comprising a gelling agent selected from the group consisting of: bentonite, attapulgite, sepiolite, starch, guar gum, xanthan gum, carboxymethyl cellulose, polyacrylates, ethylene oxides, and combinations thereof.

6. The water based drilling fluid of claim 5 further comprising a drilling fluid thinner selected from the group consisting of: tannins, polyphosphates, lignitic materials, lignosulfonates and combinations thereof.

7. A water based drilling fluid containing up to 15 pounds per barrel of an environmentally non-toxic water dispersible sodium alkylsulfosuccinate selected from the group consisting of: tetrasodium N-(1,2-dicarboxyethyl) N-alkyl $C_{18}$) sulfosuccinamate, sodium diisobutylsulfosuccinate, sodium dihexylsulfosuccinate and combinations thereof, and well drilling additives which do not precipitate said sodium alkylsulfosuccinate wherein said sodium alkylsulfosuccinate imparts anti-bit balling and lubricity properties to said drilling fluid.

8. A drilling fluid additive composition which imparts anti-bit balling and lubricity properties to a drilling fluid, said composition comprising:

(a) an environmentally non-toxic, water dispersible sodium alkylsulfosuccinate; and (b) a weight material which does not precipitate the said sodium alkylsulfosuccinate.

9. The drilling fluid additive composition of claim 8 wherein said water dispersable sodium alkylsulfosuccinate is selected from the group consisting of: tetrasodium N-(1, 2-dicarboxyethyl) N-alkyl ($C_{18}$) sulfosuccinamate, sodium diisobutylsulfosuccinate, sodium dihexylsulfosuccinate, and combinations thereof.

10. The drilling fluid additive composition of claim 8 wherein said weight material is selected from the group consisting of: barite, iron oxide, calcium carbonate, magnesium carbonate, and combinations thereof.

11. The drilling fluid additive composition of claim 8 further comprising a gelling agent selected from the group consisting of: bentonite, attapulgite, sepiolite, starch, guar gum, xanthan gum, carboxymethyl cellulose, polyacrylates, ethylene oxides, and combinations thereof.

12. The drilling fluid additive composition of claim 8 further comprising a drilling fluid thinner selected from the group consisting of: tannins, polyphosphates, lignitic materials, lignosulfonates and combinations thereof.

13. A drilling fluid additive composition which imparts anti-bit balling and lubricity properties to a drilling fluid, said composition comprising:

(a) an environmentally non-toxic water dispersible sodium alkylsulfosuccinate selected from the group consisting of: tetrasodium N-(1,2-dicarboxyethyl) N-alkyl ($C_{18}$) sulfosuccinamate, sodium diisobutylsulfosuccinate, sodium dihexylsulfosuccinate, and combinations thereof;

(b) a weight material selected from the group consisting of: barite, iron oxide, calcium carbonate, magnesium carbonate, and combinations thereof;

(c) a gelling agent selected from the group consisting of: bentonite, attapulgite, sepiolite, starch, guar gum, xanthan gum, carboxymethyl-cellulose, polyacrylates, ethylene oxides, and combinations thereof; and (d) a drilling fluid thinner selected from the group consisting of: tannins, polyphosphates, lignitic materials, lignosulfonates and combinations thereof, wherein either (b), (c), or (d) does not cause precipitation of (a).

* * * * *